United States Patent
Harris et al.

(10) Patent No.: US 10,242,570 B2
(45) Date of Patent: *Mar. 26, 2019

(54) TRAFFIC ADJUSTMENT FOR VARIABLE NETWORK STATE

(71) Applicant: HERE Global B.V., Eindhoven (NL)

(72) Inventors: John Harris, Glenview, IL (US); Leo Modica, Sawyer, MI (US); Brian Moore, Palatine, IL (US); Paul Stephens, Long Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,067

(22) Filed: Mar. 13, 2018

(65) Prior Publication Data

US 2018/0204453 A1 Jul. 19, 2018

Related U.S. Application Data

(63) Continuation of application No. 14/614,079, filed on Feb. 4, 2015, now Pat. No. 9,928,741.

(51) Int. Cl.
*G08G 1/09* (2006.01)
*G08G 1/0967* (2006.01)
(Continued)

(52) U.S. Cl.
CPC .......... *G08G 1/0967* (2013.01); *G08G 1/012* (2013.01); *G08G 1/0112* (2013.01); *G08G 1/0133* (2013.01); *G08G 1/0145* (2013.01); *G08G 1/081* (2013.01); *G08G 1/095* (2013.01); *G08G 1/096716* (2013.01); *G08G 1/096741* (2013.01);
(Continued)

(58) Field of Classification Search
CPC .... G08G 1/0967; G08G 1/0112; G08G 1/012; G08G 1/0133; G08G 1/0145; G08G 1/081; G08G 1/095; G08G 1/096716; G08G 1/096741; G08G 1/096775; H04W 4/02;
(Continued)

(56) References Cited

U.S. PATENT DOCUMENTS 5,465,289 A * 11/1995 Kennedy, Jr. ........ G08G 1/0104
340/910
5,559,864 A * 9/1996 Kennedy, Jr. ........ G08G 1/0104
340/908
(Continued)

OTHER PUBLICATIONS

Kaneda et al., Integrated User and Network Simulation for Traffic Control by Influencing User Behavior, 99-105.*
(Continued)

*Primary Examiner* — Quang Pham
(74) *Attorney, Agent, or Firm* — Lempia Summerfield Katz LLC

(57) ABSTRACT

A traffic adjustment or a traffic command, for example, is based on data congestion on a cellular network. Position data is received from a mobile device. A portion of a cellular network that corresponds to the position data is selected. The portion of the cellular network may be the geographic area covered by a cell. The network state of the portion of the cellular network is identified. A traffic device is also identified. The traffic device may be a traffic light or a variable speed sign. The traffic adjustment or traffic command for the traffic device is calculated based on the network state.

17 Claims, 10 Drawing Sheets

(51) Int. Cl.
*H04W 4/02* (2018.01)
*H04W 28/02* (2009.01)
*G08G 1/01* (2006.01)
*G08G 1/081* (2006.01)
*G08G 1/095* (2006.01)
*H04W 64/00* (2009.01)

(52) U.S. Cl.
CPC ........ *G08G 1/096775* (2013.01); *H04W 4/02* (2013.01); *H04W 28/021* (2013.01); *H04W 28/0226* (2013.01); *H04W 28/0247* (2013.01); *H04W 64/00* (2013.01)

(58) Field of Classification Search
CPC ........... H04W 28/021; H04W 28/0226; H04W 28/0247; H04W 64/00
See application file for complete search history.

(56) References Cited

U.S. PATENT DOCUMENTS

| | | | | |
|---|---|---|---|---|
| 5,745,865 | A * | 4/1998 | Rostoker | G01S 5/06 455/456.5 |
| 6,490,519 | B1 * | 12/2002 | Lapidot | G01C 21/34 340/905 |
| 7,912,628 | B2 * | 3/2011 | Chapman | G01C 21/3691 701/117 |
| 8,554,920 | B2 * | 10/2013 | Chen | H04W 84/18 370/252 |
| 8,750,849 | B1 * | 6/2014 | Adib | H04L 47/10 455/412.2 |
| 9,326,185 | B2 * | 4/2016 | Alisawi | H04W 28/0284 |
| 2004/0023678 | A1 * | 2/2004 | Fredriksson | G06F 1/14 455/502 |
| 2004/0147291 | A1 * | 7/2004 | Zhang | G08G 1/087 455/569.2 |
| 2004/0229630 | A1 * | 11/2004 | Baccelli | H04W 28/16 455/453 |
| 2006/0142933 | A1 * | 6/2006 | Feng | G07B 15/063 701/117 |
| 2006/0176847 | A1 * | 8/2006 | Chen | G08G 1/161 370/328 |
| 2010/0150120 | A1 | 6/2010 | Schlicht et al. | |
| 2010/0194552 | A1 | 8/2010 | Jaisimha et al. | |
| 2011/0105145 | A1 * | 5/2011 | Chandrasekaran | H04L 63/107 455/456.1 |
| 2012/0290202 | A1 * | 11/2012 | Gueziec | H04W 4/029 701/423 |
| 2012/0330546 | A1 * | 12/2012 | Zhao | G01C 21/3492 701/516 |
| 2013/0013179 | A1 * | 1/2013 | Lection | G08G 1/0145 701/117 |
| 2013/0024107 | A1 | 1/2013 | Xie et al. | |
| 2013/0295921 | A1 * | 11/2013 | Bhargava | H04W 48/20 455/426.1 |
| 2014/0004865 | A1 * | 1/2014 | Bhargava | H04W 74/0816 455/445 |
| 2014/0025281 | A1 | 1/2014 | Zhao et al. | |
| 2014/0079218 | A1 * | 3/2014 | Cheng | H04W 24/00 380/270 |
| 2014/0106736 | A1 * | 4/2014 | Olson | H04W 24/10 455/422.1 |
| 2014/0107923 | A1 * | 4/2014 | Gueziec | H04W 4/029 701/533 |
| 2014/0149029 | A1 * | 5/2014 | Sakakibara | G08G 1/0116 701/118 |
| 2014/0195102 | A1 | 7/2014 | Nathanson | |
| 2015/0085651 | A1 * | 3/2015 | Kudo | H04W 28/0247 370/230 |
| 2015/0133169 | A1 * | 5/2015 | Jozwiak | G06Q 30/02 455/456.3 |
| 2015/0215216 | A1 * | 7/2015 | Ekici | H04L 47/2433 370/235 |
| 2015/0262477 | A1 * | 9/2015 | Fowe | G08G 1/0133 701/118 |
| 2016/0249180 | A1 * | 8/2016 | Li | G08G 1/096716 |
| 2016/0337242 | A1 * | 11/2016 | Barberis | H04W 16/32 |

OTHER PUBLICATIONS

E. Abinaya, R. Sekar, "An Intelligent Secure Traffic Management System Based on Vanet", IOSR Journal of Electronics and Communication Engineering (IOSR-JECE), Jan. 2014, p. 15-27, vol. 9, Issue 1, Ver. II, US.

European Search Report for related European Application No. 16154052.1 dated Jun. 28, 2016.

Kaneda, Shigeru et al., "Integrated User and Network Simulation for Traffic Control by Influencing User Behavior", pp. 1-7, Oct. 10-13, 2005.

Pratima L Patel et al: "Design Approach for Adaptive Traffic Light Control System Based on Radio Propagation Model in VANET," pp. 268-271, Apr. 6, 2013.

European Search Report for European Patent Application No. 16154052.1-1215 dated Dec. 12, 2018.

Pratima L. Patel et al: "Design Approach for Adaptive Traffic LightControl System Based on Radio Propagation Model in VANET", Communication Systems and Network Technologies(CSNT), 2013 International Conference On, IEEE, Apr. 6, 2013(Apr. 6, 2013), pp. 268-271.

Shigeru Kaneda et al: "Integrated user and network simulation fortraffic control by influencing user behavior", PE-WASUN '05 Proceedings of the 2nd ACM international workshop on Performance evaluation of wireless ad hoc, sensor, and ubiquitousnetworks, Oct. 13, 2005 (Oct. 13, 2005), pp. 99-105.

* cited by examiner

| | Cell 1 | Cell 2 | Cell 3 | Cell 4 | Cell 5 |
|---|---|---|---|---|---|
| Signal A | H | L | X | X | X |
| Signal B | L | L | H | H | X |
| Signal C | H | L | L | H | H |
| Speed A | X | X | X | H | L |
| Speed B | X | X | X | L | H |

TRAFFIC ADJUSTMENT FOR VARIABLE NETWORK STATE

This application is a continuation under 37 C.F.R. § 1.53(b) and 35 U.S.C. § 120 of U.S. patent application Ser. No. 14/614,079 filed Feb. 4, 2015 which is incorporated by reference in its entirety.

FIELD

The following disclosure relates to traffic control based on network state, or more particularly, algorithms for determining traffic adjustments in a geographic region as a function of cellular network usage.

BACKGROUND

Mobile data networks cover most geographic areas. The data networks may include any type of cellular networks, or other networks based on, for example, satellite communication or microwave communication that also provide mobile data. Mobile devices may have nearly constant data network needs as they travel from cell to cell.

The typical cellular network experiences high disparity between the traffic of the individual cells. In some examples, the 15-20% portion of cells that are most heavy loaded in a cellular network determine the limits of a cell system. In other words, because 15-20% of cells carry over 50% of the traffic, the availability of connectivity across the network may regularly depend on the traffic on one or a few cells.

Technologies such as the internet of things and connected vehicles are gaining popularity. These technologies may add multiple nodes to the mobile data networks for each new user. In addition, systems in smart cities and other types of mobile control systems add nodes to the mobile data networks. As these technologies demand greater bandwidth from mobile data networks, data traffic may grow faster than the existing infrastructure can support. Hardware upgrades may slow the impact on mobile data network. However, what is needed is an immediate and effective algorithm for spreading the traffic usage across cells without incurring the cost or delay of hardware upgrades.

SUMMARY

In one example, a computing device is configured to perform a method including identifying a traffic device for a vehicle or a pedestrian, and generating a traffic adjustment for the traffic device as a function of network activity or potential network activity at a portion of a cellular network.

In one example, a computing device is configured to perform a method including receiving position data for a mobile device, selecting a portion of a cellular network based on the position data, identifying a network state of the portion of the cellular network, identifying a traffic device based on the position data or the selected portion of the cellular network, and generating, at a processor, a traffic adjustment for the traffic device in response to the network state.

In one example, a computing device is configured to perform a method including identifying a network state of a portion of a cellular network, identifying a vehicle traffic device or a pedestrian traffic device, and generating a traffic adjustment for the vehicle traffic device or the pedestrian traffic device in response to the network state.

BRIEF DESCRIPTION OF THE DRAWINGS

Exemplary embodiments are described herein with reference to the following drawings.

DETAILED DESCRIPTION

The cells of mobile networks may become more congested and less congested as motor vehicles, pedestrians, or other carriers of mobile devices travel in and out of an individual cell of the mobile networks. The mobile networks may be data networks that support voice calls, text messages, and any data traffic (e.g., internet protocol (IP) traffic). The mobile devices may include mobile phones, connected vehicles, laptop computers, tablet computers, or other devices configured to connect to the mobile networks.

The travel of mobile devices into and/or out of an individual cell of the mobile network may be controlled according to the movement of the vehicles, pedestrians, or other carriers of the mobile devices. For example, traffic signals (stoplights) may be controlled to dictate the movement of vehicles, and pedestrian signals may be controlled to dictate the movement of pedestrians. In another example, speed limits may be adjusted to promote or hasten the movement of vehicles in or out of individual cells. It should be noted that the individual cells have variable borders that may not cover a constant geographic area but flex depending on the relative signal strengths and interference from adjacent cell towers.

In one example, a sign may be controlled to convey the existence of congested mobile networks. In another example, messages may be sent to mobile device to suggest a traffic adjustment to the carrier of the mobile device. In another example, messages may be sent to an assisted driving device to promote or hasten the movement of vehicles in or out of individual cells.

The congestion level of the mobile network, or a particular cell within a mobile network, may be determined based on a measurement of transmission resources of the network or utilization of the network. Transmission resources of the network may include bandwidth, signal strength, speed, or another factor. The utilization of the network may depend on the number of users or the number of a particular class of users (e.g., smartphones, connected cars, heavy traffic users, or other types of users).

The following embodiments include systems, methods, and apparatuses for controlling the flow of mobile devices in and out of cells within a mobile network or providing information to users to facilitate the control of mobile devices in and out of cells within the mobile network. The alternatives and implementation of this system, method, and/or apparatus is described in further detail herein.

Figure 1:
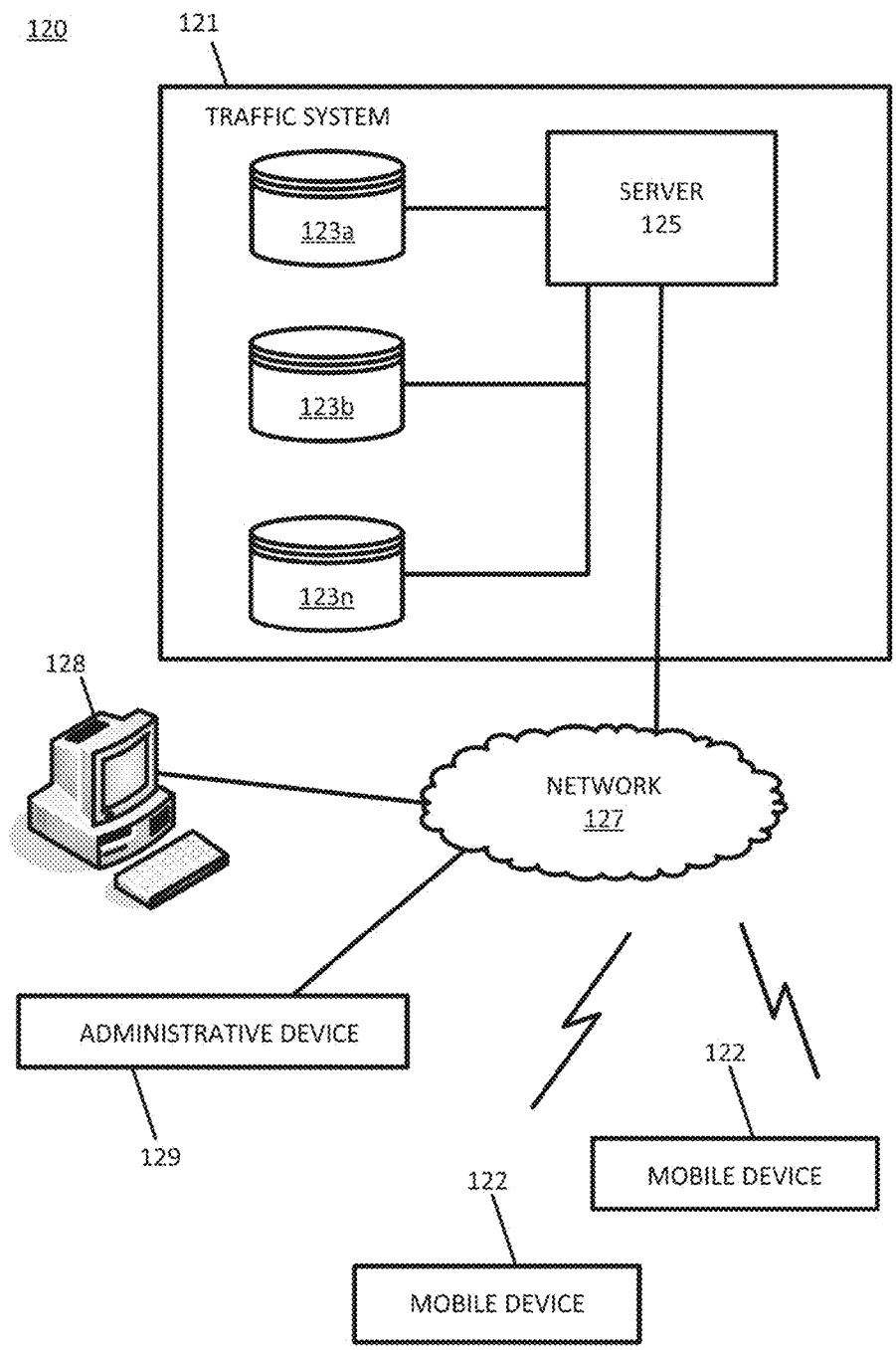
FIG. 1 illustrates a system for determining a network state in a mobile data network.

FIG. 1 illustrates an example system 120 for determining a network state in a mobile data network. The system 120 includes a traffic system 121, one or more mobile devices 122, a workstation 128, and a network 127. Additional, different, or fewer components may be provided. For example, many mobile devices 122 and/or workstations 128 connect with the network 127.

The traffic system 121 includes a server 125 and one or more databases 123a-c. The database 123a may include a probe database that relates to locations of mobile devices 122. The database 123b may include a traffic database that includes geographic locations and patterns of traffic devices and/or traffic congestion data and/or a cellular network database that includes the locations of cellular access points or towers. The database 123c may include a geographic database including road links or segments, points of interest, and other data. The databases 123a-c may be distributed in any combination or combined into a single database that includes any combination of map data, cellular access point locations, and traffic device locations.

The server 125 is configured to receive position data for one or more of the mobile devices 122. The position data may be generated at the mobile devices using global positioning system (GPS), which may be supplemented or replaced by accelerometers or another inertial type of sensor. The position data may be based on cell fingerprinting. In one example, cell fingerprinting involves the detection of a particular mobile device within range of or connected to a particular access point in order to estimate the location of that mobile device based on the location of the access point. The position data may be derived from deep packet inspection. For example, the server 125 may observe application layer traffic and identify keywords or metadata indicative of the position of the mobile device 122 (e.g., route planning, location based searches). The position data may be stored in the database 123.

The server 125 is configured to select a portion of the network 127 based on the position data. For example, one of the databases 123a-c may include a mapping between geographic locations and the typical range of radio towers of the network 127. For example, the network 127 may be associated with geographical areas that are circular, hexagonal, or another shape. The server 125 may compare the position data from the mobile device 122 to the mapping to determine which cell the mobile device 122 is traveling in or near, or to which radio tower the mobile device 122 is nearest. Alternatively, the server 125 may selected based on communication between the mobile device 122 and the access point or cellular tower. The communication includes an identifier or address of the mobile device 122. The server 125 may determine the location of the cell or portion of the cellular network based on the identifier or address.

The server 125 is configured to identify a network state of the network 127. The network state information may be received from an administrative device 129 for the network 127. The administrative device 129 may be an evolved node B device or another device that may collect information on the network state of the network 127. The network state may describe the bandwidth available on the portion of the network 127, the data speed of the network 127, or the radio resources of the portion of the network 127. The network state may be the bandwidth, speed, or resources available to the next mobile device 122 to connect to the portion of the network 127. The network state may be a number of current mobile devices 122 connected to the portion of the network 127.

The server 125 is configured to identify a traffic device based on the position data or based on the portion of the selected network. In one example, a lookup table associates different locations (e.g., geographic coordinates) with traffic devices. In another example, a lookup table associates different cell identifiers (e.g., access point or cellular tower) with traffic devices. The traffic device may include traffic signals, electronic traffic signs, or other devices. The traffic database 123b may include a mapping of geographic locations to traffic devices. Thus, the server 125 may identify a traffic device that is near the position of the mobile device 122. Alternatively, the server 125 may identify a traffic device that is along a road segment or route in the direction that the mobile device 122 is traveling (downstream).

The server 125 is configured to generate a traffic adjustment for the traffic device in response to the network state or a potential network state and/or as a function of the network state or the potential network state. The server 125 may compare the network state to a threshold. The traffic adjustment may be a change in the operation of a traffic signal (e.g. a traffic light). The traffic adjustment may be a change in a speed limit or advisory on an electronic sign. The traffic adjustment may communicate the network state of a geographic area. The traffic adjustment may display an instruction on an electronic sign for the user which may also be a carrier (e.g., vehicle or pedestrian) of a mobile device to travel in a particular direction. Examples described herein include techniques for traffic adjustments to traffic devices based on network state. The potential network state may be based on the number of users connected to the network 127, the number of users traveling in the area, historic usage patterns of users based on time of day, day of week, or an event.

The potential network state based on a type of user or mobile device in an area (e.g., heavy users versus light users). If several users of a specific type are in the area, even when the users are not at high usage levels, the server 125 may identify the potential for a change in the network state.

In one embodiment a user or consumer of the traffic adjustment may be a user which is not a carrier of a wireless device. For example, a user which is not a carrier of a wireless device may be a considered a very light or non-Internet user. That user may tend to encounter longer waits for example where the cellular network is less efficient, and shorter rates where the cellular network is more efficient.

The mobile device 122 may be a personal navigation device (PND), a personal navigation assistant (PNA), a portable navigation device, an in-car navigation device, a smart phone, a mobile phone, a personal digital assistant ("PDA"), a tablet computer, a notebook computer, cellular universal serial bus (USB) dongle attached to a laptop computer, and/or any other known or later developed mobile device or personal computer. The mobile device 122 may be a connected car computer and/or a vehicle itself.

The traffic system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include traffic commands that the server 125 push out to the administrative device 129 or the mobile devices 122. The workstation 128 may include at least a memory, a processor, and a communication interface.

Figures 2A, 2B:
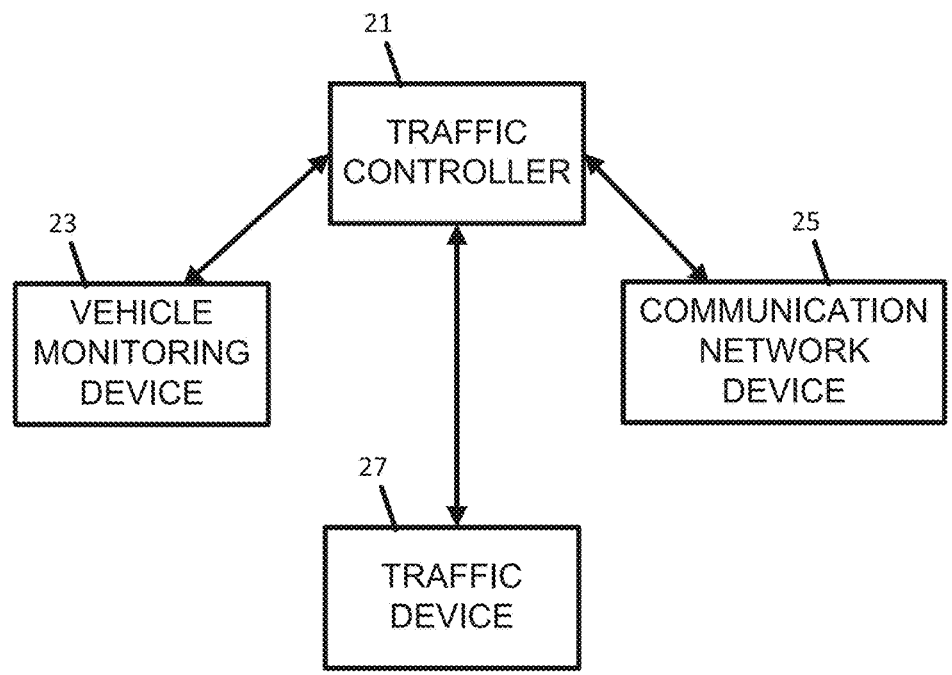
FIG. 2A illustrates a system for determining a traffic adjustment based on a network state.
FIG. 2B illustrates a table for traffic adjustments based on network state.

FIG. 2A illustrates a system for determining a traffic adjustment based on a network state. The system includes a traffic controller 21, a vehicle monitoring device 23, a communication network device 25, and a traffic device 27. The traffic device may be a traffic light, a traffic signal, a walk sign, a variable speed limit sign, an electronic sign, a gate (e.g., an arm that moves up and down to allow vehicles to pass through), a direction sign (arrow or X that describes travel direction for a lane), or another electronic traffic device. Additional, different, or fewer components may be included. The functions described herein for the traffic controller 21, the vehicle monitoring device 23 and the communication network device 25 may be performed by a single device, such as the server 125.

The communication network device 25 may be configured to identify the network state of a mobile network. The communication network device 25 may measure communication load on the network 127. In one example, the network state may be either congested (high amount of data traffic) or uncongested (low amount of data traffic). The network state may describe cell utilization. In another example, a rating is assigned to describe the network state (e.g., 1 for low congestion to 10 for high congestion) to describe cell utilization or congestion.

The network state may include radio frequency congestion. The radio frequency congestion may be calculated based on the number of physical resource blocks that are being used on the network. Each physical resource block may be an amount of time that a subcarrier signal is used. The physical resource block has both a time component or dimension and a frequency resource utilization component or dimension. The communication network device 25 may include an evolved node B (eNB) configured to determine how many of the physical resource blocks have been allocated to the mobile device 122. The eNB may aggregate the allocated physical resource blocks across multiple or all mobile devices 122 on the network.

The network state may be determined and disseminated using the resource consumption techniques described in Application-Layer Traffic Optimization (ALTO) Protocol available at the IETF website at RFC 7285, which is incorporated by reference.

The network state may be based, at least in part, on a per user (mobile device 122) throughput. The per user throughput describes the amount of data allocated to the mobile device 122. The per user throughput may include a bandwidth component (e.g., data quantity per unit time, e.g., megabits per second) and/or a latency component (e.g., round trip time or ping time). The per user throughput may be detected at the mobile device 122 or at the server 125.

The network state may be based, at least in part, on the signal strength. The signal strength may be described by a received signal strength indicator (RSSI), reference signal received power (RSRP), or reference signal received quality (RSRQ). The RSSI measures the average total received power observed in orthogonal frequency division multiplexing (OFDM) symbols. The RSSI may include the power from the signal, adjacent channel interference, thermal noise, or other factors. The RSSI may be summed over multiple carrier signals to determine the network state. The RSRP may be the power of the reference signals over the bull bandwidth of the network. The RSRQ is a function of RSSI and the number of allocated resource blocks (N): $RSRQ=(N*RSRP)/RSSI$.

Any of these signal strength metrics may estimate distance to the radio tower or the data rate achieved at (e.g. either received by or transmitted by) the mobile device 122. The mobile devices 122 may detect signal strength and report the signal strength back to the communication network device 25.

The signal strength (e.g., RSRQ, RSRP, RSSI) may be largely or partially independent of congestion. The signal strength conveys whether or not a mobile device 122 has a strong signal because signal strength generally increases as the mobile device 122 is closer to the cellular transceiver. The signal strength, however, may not be indicative of the congestion of the cell. For example, signal strength may be good but congestion still exists because of the number of connected mobile devices 122. However, poor signal strength may be indicative of poor data rates. Thus, poor signal strength may indicate that data rates are low, but high signal strength does not necessary indicate that data rates are high.

The network state or customer experience of the network state may also be based on the number of users that share the cell or contribute to cellular congestion. In one example, the number of users at a given usage level may be inversely related to the estimate of the per user customer experience of the network state. More users at a given per user usage level results in less bandwidth availability to an individual user. In another example, the number of users also impacts the congestion. A single user or a few users allocating a lot of bandwidth may not notice when some of the bandwidth is reallocated to another user, but when the cell is crowded with many users having allocated small amounts of bandwidth, any reduction of bandwidth may be noticed.

The network state may be inferred from the locations of mobile device 122. For example, the mobile devices 122 may report location data from GPS to the communication network device 25. The network state may be estimated based on the number of mobile devices 122 present in a particular cell.

The network state may be described as either efficient or inefficient. An efficient location may be a location that is under an uncongested cell, a location that has good signal strength, or both. An inefficient location may be a location that is under a congested cell, a location that has poor signal strength, or both.

The communication network device 25 may generate an IP packet including the network state and send the packet to the traffic controller 21. The communication network device 25 may send the packet to the network 127 or another location on the Internet that is accessible by the traffic controller 21. In one example, the network state may be available at a publicly accessible address or through an application programming interface.

The communication network device 25 may also classify mobile devices 122 according to data usage. The classifications may include two, three, or another number of classifications. For example, mobile device 122 may be classified into heavy data users and light data users or heavy, medium, and light data users. The communication network device 25 may monitor whether individual mobile devices 122 are currently classified as heavy users or light users.

The classification may be based on measured quantities of data usage. For example, the communication network device 25 may monitor actual data usage. The communication network device 25 may determine how much data, bandwidth, or physical resource blocks are being used by each mobile device 122. The classification may be based on the type of device. For example, usage may be a constant value depending on the device. One value may be used for smartphones, another value for laptop computers, and another value for connected vehicles.

The classification may be based on historical usage. Rather than real time monitoring, the classification network device 25 accesses historical data usage or calculates historical usage. If a device typically uses a lot of data or has used significant data in the past, it may be classified as a heavy data user for at least a time period (e.g., one week or one month).

The vehicle monitoring device 23 may monitor the locations of vehicles traveling in a geographic region. The mobile device 122 may generate GPS data or another type of location data and periodically report their locations back to the traffic controller 21. The location data may be reported every predetermined time period or when the location deviates from a previous measurement by a threshold amount.

The traffic controller 21 generates a command for traffic device 27 based on the data received from the vehicle monitoring device 23 and the communication network device 25. The traffic controller 21 may monitor the locations of the mobile device(s) 122, whether the mobile device(s) 122 are heavy data users or light data users, and the network states of geographic areas corresponding to cells, and generate the command for the traffic device 27 to distribute the mobile device 122 evenly across, e.g. across consecutive congested cells. Users in congested cells may be encouraged to leave the cell or speed up by turning traffic lights green or increasing speed limits. Users in uncongested cells may be encouraged to stay in the cell longer or slowed down by turning traffic lights red or decreasing speed limits. These measures may be applied only to heavy data users. In one example, heavy data users are kept distributed as much as possible across the cells. Through distributing traffic commands to one or more traffic devices 27, the traffic controller 21 improves the cellular efficiency or RF efficiency of and customer experience in a geographic region because data users are spread out across cells, which reduces the number of cells and associated hardware required to support the mobile data network.

FIG. 2B illustrates a table 31 for traffic adjustments based on network state. The table 31 includes patterns of cellular congestion of multiple cells. In table 31, high congestion is represented by "H" and low congestion is represented by "L". The "X" in table 31 represents that the congestion may be either high or low for the cell and still match the pattern. Each cell may be the area surrounding a radio transceiver. The cells may be adjacent to one another. For example, the cells may be arranged to cover a geographic region (e.g., arranged in a rectangle or hexagon). The cells may follow a geographic features such as a road. For example, cell 1 may be upstream of cell 2 with respect to the road, and cell 2 may be upstream of cell 3 and so on.

The traffic devices may be located in the geographic region of the cells. The traffic devices may be traffic lights, traffic signs, or another device. Different patterns in the cellular congestion may trigger different signals for the traffic devices. When cell 1 has high congestion and cell 2 has low congestion, the pattern is matched for signal A, which specifies the command for the traffic device 27. In one example, the signal is immediately turned to a specific state (e.g., green or yellow). In one example, the time duration for a state is increased or decreased by a predetermined amount. The command for signal A may encourage mobile devices to move out of cell 1 and/or into cell 2. For the pattern of signal A, the other cells (cell 3-5) may have any network state. The command for signal B may slow the progression of mobiles devices from cell 1 and/or cell 2 into cell 3 and/or cell 4. For the pattern of signal B, cells 1-4 have a specific state and cell 5 may have any state. The command for signal C may slow the flow of mobile devices from cell 3 to cell 4, increase the flow of mobile devices from cell 1 to cell 2, and/or increase the flow of mobile devices from cells 4 and 5. For pattern of signal C, cells 1-5 have a specific state.

The bottom two patterns in table 31 may determine a speed limit for a variable speed sign. For example, the variable speed sign may determine the speed of vehicles driving from cell 4 to cell 5. When cell 4 is congested and cell 5 is not congested, the speed limit may be set to a high level, which increases the rate at which mobile device 122 move from cell 4 to cell 5. When cell 5 is congested and cell 4 is not congested, the speed limit may be set to a low level, which decreases the rate at which mobile device 122 move from cell 4 to cell 5.

Figure 3:
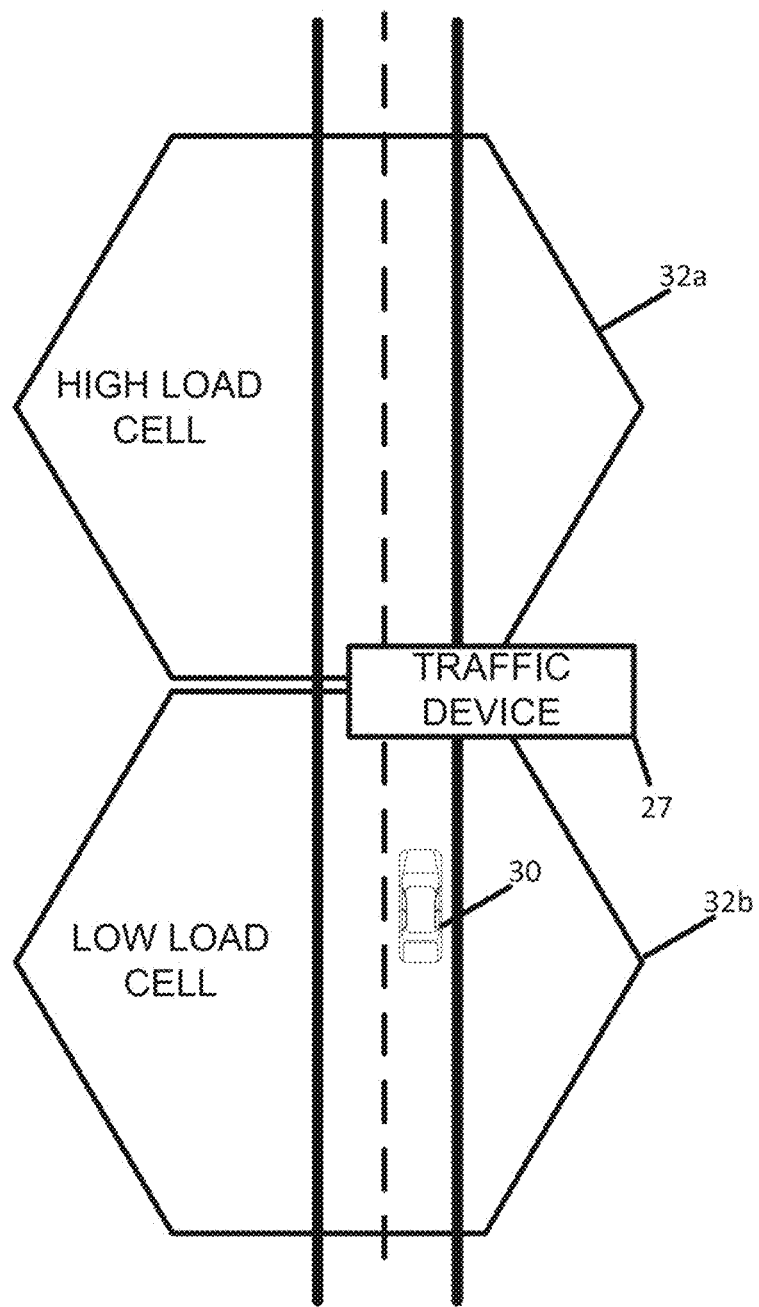
FIG. 3 illustrates an example mobile data network and traffic network.

FIG. 3 illustrates an example mobile data network and traffic network including at least one traffic device. A road is illustrated but other types of paths such as pedestrian paths, train paths, waterways may be used. A traffic device 27 may affect the operation of a vehicle 30 traveling on the road.

The mobile data network may include a high load cell 32a and a low load cell 32b. For example, the communication network device 25 may have determined the network states and compared the network states to a threshold in order to identify the high load cell 32a and the low load cell 32b. The traffic device 27 may be controlled based on the location of vehicle 30 and the relative congestions of the cells.

In one example, the traffic device 27 may be instructed to reduce the speed limit when there has been a cellular outage (coverage hole) or high congestion experienced in the cellular network. From a safety perspective, people may be distracted when the data traffic suffers. For example, users may attempt to troubleshoot the mobile device 122, taking attention away from driving. When the vehicle 30 is approaching the high load cell 32a, the speed limit displayed by the traffic device 27 may be lowered. Slower driving, especially when distracted by the low data rates of the mobile device, can lead to fewer accidents. Similarly, connected cars may rely on data access for navigation or supplemental information. When the connected car experiences a loss of data, the user may be distracted or disrupted from the interruption in the normal driving experience. Slower driving, especially when distracted or interrupted from the low data rates of the mobile device, means fewer accidents.

In one further detailed embodiment on how a cell may follow a feature such as a road, consider the case where there is an intersection of two different roads, one heading north south and one heading east west. A first cell stretches along the north-south road, and a second cell stretches along the east-west road. In some embodiments, when considering the traffic light timing for a particular road, this is done with respect to the cell which cover that road, as opposed to the cell which is covering the intersecting road.

In another embodiment, if there is a single cell which covers both the north-south and the east-west intersecting road, but there is more heavy Internet use vehicular traffic on the east-west road, then the embodiments described below are applied to the timing of the light impacting travel on the east-west road.

In another embodiment, consider the scenario where there is a small cell with a smaller coverage area—covering just the intersection of two different roads, one heading east and west and the other heading north and south. Considering the scenario where this small cell is uncongested and particularly RF efficient, and heavy users may tend to encounter longer waits at this traffic light, regardless of which road they are on. This allows these heavier Internet users to opportunistically fetch larger amounts of media while paused at the red traffic light. When this advance fetching is completed, these heavy users become light users in the sense that they no longer need significant additional communication network resources, and the traffic light can more opportunistically turn green.

In another example, the traffic device 27 may be instructed to alter a traffic light cycle for the intersection. When the high load cell 32a is downstream of the low load cell 32b (right side of the road in FIG. 3), the light cycle may be adjusted to decrease the green or proceed portion of the light cycle and/or increase the red or stop portion of the light cycle. Thus, mobile devices 122 proceed from the high load cell 32b to the low load cell 32a at a lesser rate. When the low load cell 32b is downstream of the high load cell 32a (left side of the road in FIG. 3), the light cycle may be adjusted to increase the green light or proceed portion of the light cycle and/or decrease the red light or stop portion of the light cycle. Thus, mobile devices 122 proceed from the high load cell 32a to the low load cell 32b at a greater rate.

In another example, the traffic command may also be based on whether the vehicle 30 is a heavy data user or a light data user. The traffic device 27 may select the traffic command to increase the amount of time that a heavy data user stays in the low load cell 32a and/or decrease the amount of time that a heavy data user stays in the high load cell 32b. Similarly, the traffic device 27 may select the traffic command to decrease the amount of time that a light data user stays in the low load cell 32a and/or increase the amount of time that light data user stays in the high load cell.

Figure 4:
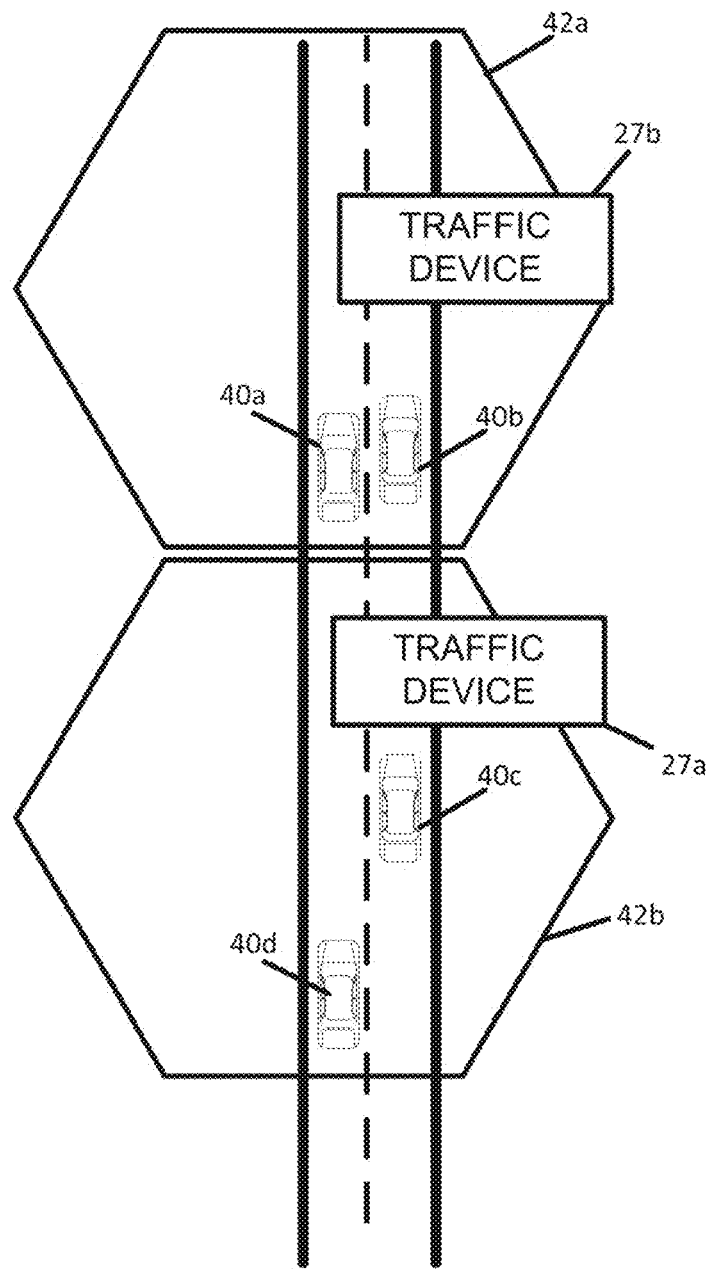
FIG. 4 illustrates another example mobile data network and traffic network.

FIG. 4 illustrates another example mobile data network and traffic network including at least two traffic devices 27a-b. In this example, two traffic devices 27a-b are controlled to regulate the vehicles traveling on the road. The traffic devices 27a-b may be controlled to generally increase the number of vehicles 30 in a first cell 42a and generally decrease the number of vehicles 30 in a second cell 42b. The first cell 42a may be uncongested, and the second cell 42b may be congested, or vice versa. The traffic devices 27a-b may also be controlled as a function of the data usage by the mobile devices of the vehicles.

Table 1 illustrates some examples for controlling the operation of traffic devices 27a-b as illustrated by FIG. 4. In this example, the data consumption of vehicles 40b and 40c are known. In this figure, the understanding is that the all four vehicles are heading in the same direction (upwards with respect to FIG. 4, i.e. from cell 42b to 42a). For example, if there is a red traffic light at 27b then the vehicles 40a and 40b spend more time in cell 42a. Alternatively, if for example there is a green traffic light at 27b then the vehicles 40a and 40b will spend less time in cell 42a. Additionally, if there is a red traffic light at 27a then the vehicles 40c and 40d will spend more time in cell 42b. Alternatively, if for example there is a green traffic light at 27a then the vehicles 40c and 40d will spend less time in cell 42b. The term "more delay" for the traffic devices 27a-b indicates one or more of increasing the red light cycle time and/or decreasing the green light cycle time when the traffic device is a traffic light, shifting the timing of the red light to correspond more closely with the arrival time of the user at the traffic light and decreasing the speed limit when the traffic device is a speed limit sign. The term "less delay" for the traffic devices 27a-b indicates one or more of decreasing the red light cycle time and/or increasing the green light cycle time when the traffic device is a traffic light, shifting the timing of the green light to correspond more closely with the arrival time of the user at the traffic light in that direction and increasing the speed limit when the traffic device is a speed limit sign. The term "no change" indicates that the cycle time for a traffic light is left at the default value and the speed limit for the speed limit sign is left at the default value.

TABLE 1

| Scenario | Vehicle 40b | Vehicle 40c | Cell 42a | Cell 42b | Device 27a | Device 27b |
| --- | --- | --- | --- | --- | --- | --- |
| A | Heavy | Light | Low | High | More delay | More delay |
| B | Light | Heavy | Low | High | Less delay | Less delay |
| C | Heavy | Light | High | Low | Less Delay | Less delay |
| D | Light | Heavy | High | Low | More Delay | More Delay |

A first sub scenario is—heavy users approaching a traffic light (under a high load cell) may experience less delay. In the embodiments represented in table 1, (40c in scenario B and 40b in scenario C) when a heavy user approaches a high load cell the traffic device tends to generate less delay, in order to minimize the amount time spent in that inefficient scenario.

The second sub scenario is heavy users approaching a traffic light (under a low load cell) may experience more delay. In order to avoid the first sub scenario reducing the overall delay experienced by a heavy user across a set of traffic lights, the heavy user may then receive more delay where there is a low load cell (40c in scenario D and 40b in scenario A). Also, this allows the heavier Internet users to more opportunistically fetch larger amounts of media when in this efficient scenario A third sub scenario is light users approaching a traffic light (under a high load cell) may experience more delay. For example, in order to avoid consistently reducing the amount of delay at a particular traffic light where there is a high load cell, after a heavy user causes there to be less delay at that traffic light, subsequent light users passing through that traffic light in a high load cell may experience more delay (40c in scenario A and 40b in scenario D). Additionally, because reducing the overall delay experienced by a heavy user at a specific traffic light traffic light under a high load cell may cause users traveling other directions through that traffic light to experience more delay, a light user approaching the traffic light (under a high load cell) (e.g. from another direction) may experience more delay when approaching the traffic light (under a high load cell).

A fourth sub scenario is—light users approaching a traffic light (under a low load cell) may experience low delay. In order to avoid the third sub scenario increasing the overall delay experienced by a light user across a set of traffic lights, the light user may then receive less delay where there is a low load cell (40c in scenario C & 40b in scenario B).

In some embodiments, when the signal strength received by cars waiting at a traffic light is worse, e.g. because the traffic light is farther from the nearest or serving cell, then having heavy Internet users wait that traffic light is less efficient. Consequently, in the embodiments discussed above having the traffic light additionally be in a worse signal strength environment, makes a user waiting at that traffic light even less RF efficient. In this way, in the embodiments presented, having the traffic light be farther from the serving cell, has an impact which is similar to the impact of greater congestion at that cell.

In another example, the traffic controller 21 may identify only heavy data users and control the traffic devices 27*a-b* to separate the heavy users. In this example, the congestion of the cells may or may not play a role in determining the commands sent to the traffic devices. Table 2 illustrates an example in which the data usages of the four vehicles illustrated in FIG. 4 are known, and the congestion of the cells does not play a role in the generation of the command from the traffic controller 21. For example, a case may exist in which, vehicles 40*c* and 40*d* enter cell 42*a* before vehicles 40*c* and/or 40*d* exit cell 42*a*.

In another example, a series of geographically sequential traffic lights along one or more road segments labeled sequentially and alphabetically as A, B, C, D, and E. Traffic lights A, C, and D have low Internet connectivity because there is more congestion or greater RF path loss. Traffic lights B and E have better internet connectivity because there is less congestion or less RF path loss. The traffic controller 21 may send traffic commands to the set of traffic lights so that that heavy data traffic users are more likely to stop at traffic lights B and E and less likely to stop at traffic lights A, C, and D. The overall vehicular congestion may be constant but the traffic lights that heavy users are stopped at on average would be different that the traffic lights that other users are stopped at on average.

Figure 6:
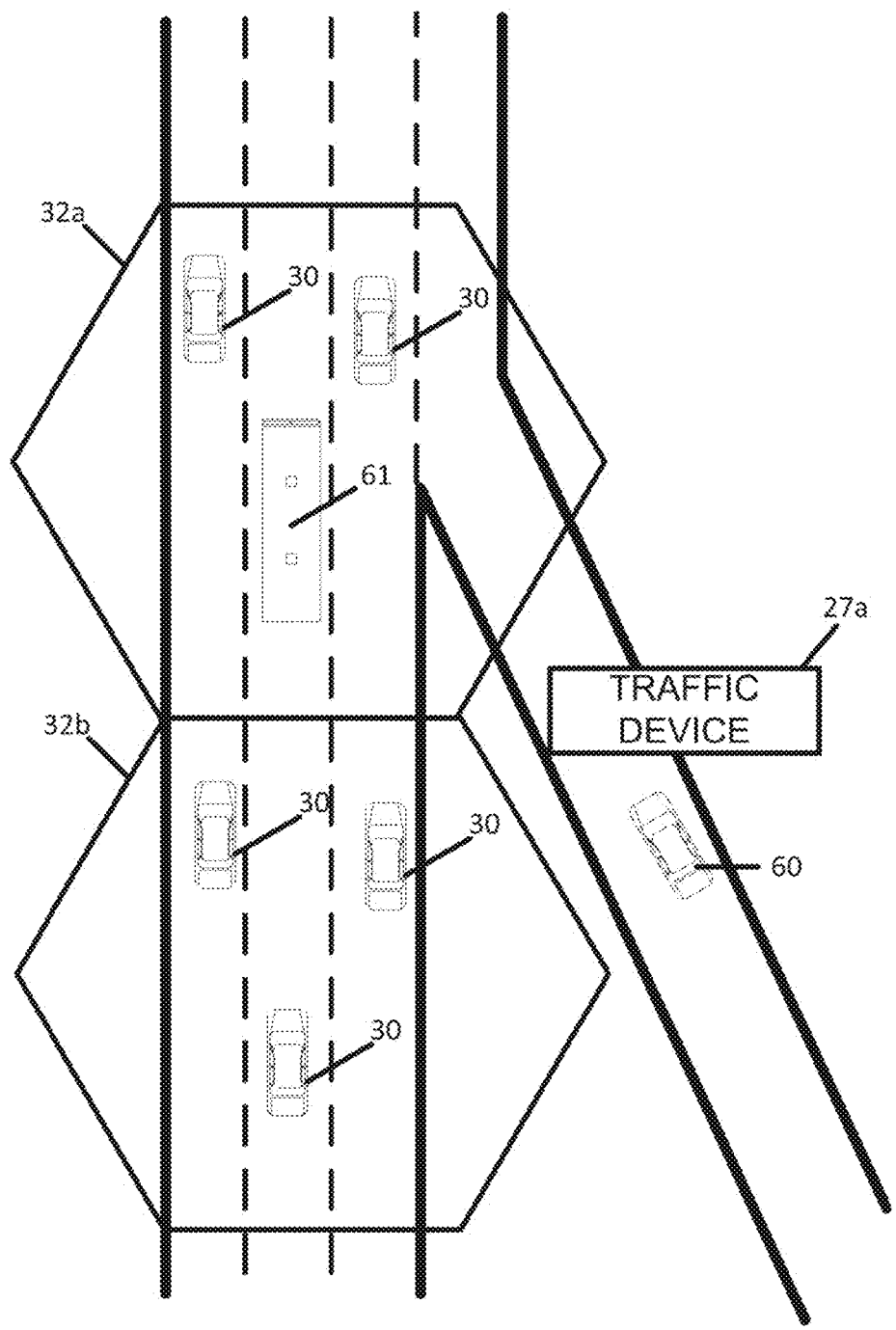
FIG. 6 illustrates another example mobile data network and traffic network.

FIG. 6 illustrates another example mobile data network and traffic network. As illustrates vehicles 30 and bus 61 are traveling along a road. A traffic device 27*a* may be a traffic light that regulates flow onto a highway from an entrance ramp. The traffic device 27*a* in this example may be referred to as an entrance ramp gate. The communication network device 25 may identify one or more heavy data users. For example, bus 61 may have multiple mobile device users. The

TABLE 2

| Scenario | Vehicle 40a | Vehicle 40b | Vehicle 40c | Vehicle 40d | Device 27a | Device 27b |
|---|---|---|---|---|---|---|
| A | Heavy | Heavy | Heavy | Heavy | More delay | Less delay |
| B | Light | Heavy | Light | Heavy | More delay | No change |
| C₁ | Heavy | Light | Heavy | Heavy | No change | Less delay |
| C₂ | Heavy | Light | Heavy | Heavy | More delay | No change |
| D | Heavy | Heavy | Light | Light | No change | No change |

In further embodiments, multiple cellular networks are addressed and kept separate for the analyses above. The communication network device 25 may identify the service provider of the mobile devices 122, and the network state of each service providers independently. Thus, mobile devices 122 are analyzed in groups based on service providers. Alternatively, a similar situation arises with multiple bands of a single service provider.

The following is an example in which these options for either band or service provider are referred to as Alpha, Beta and Gamma. In the case where only the Gamma cellular network is congested in the area around a particular traffic device, then the traffic device timing embodiment discussed earlier, primarily receives traffic commands based on the presence of heavy Gamma Internet users, (i.e. users which are subscribed to cellular network Gamma). Alternatively, the traffic controller 21 may analyze the cellular congestion and presence or absence for each of Alpha, Beta, and Gamma, and generate a traffic command that improves the network coverage of the network or network portion that is most congested.

Figure 5:
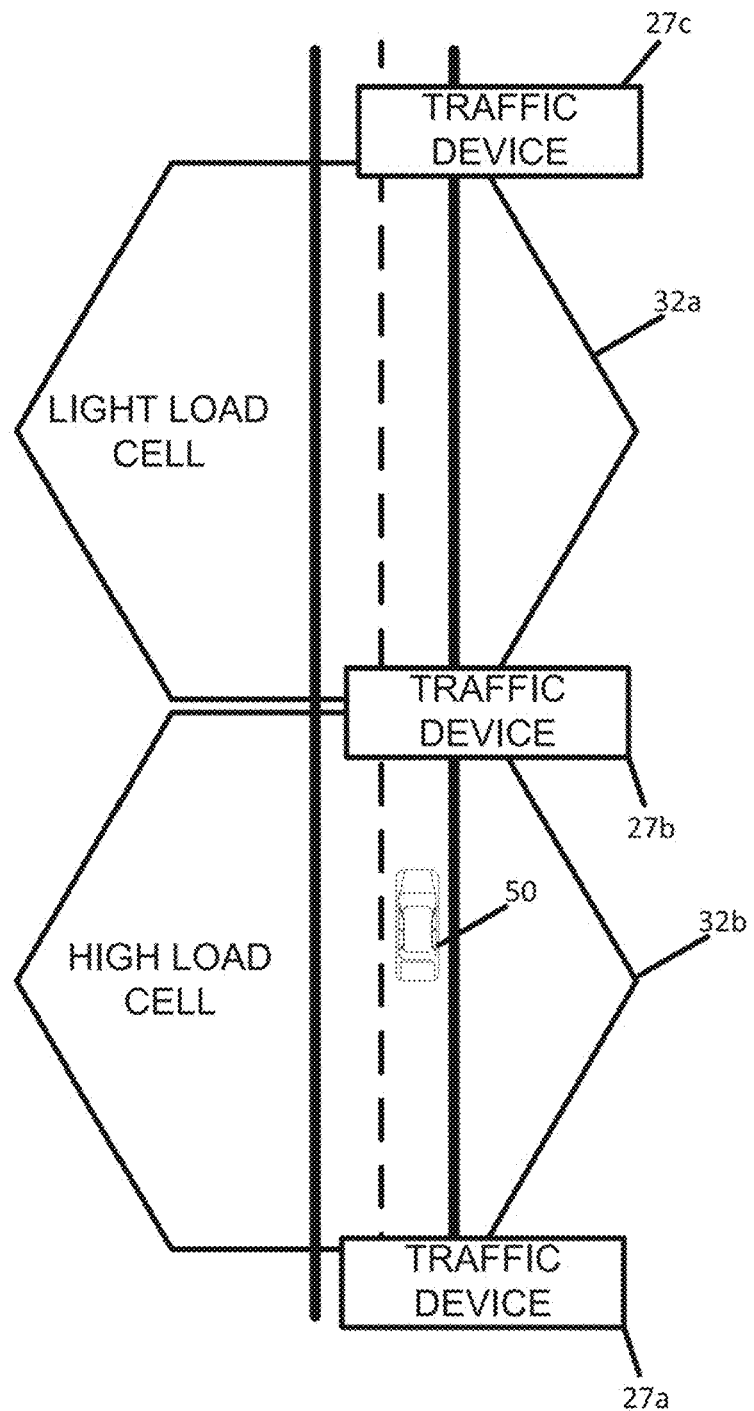
FIG. 5 illustrates another example mobile data network and traffic network.

FIG. 5 illustrates another example mobile data network and traffic network including at least three traffic devices. In this example, a vehicle 50 includes a mobile device 122 that is a heavy data user. The path of the vehicle 50 extends from traffic device 27*a*, to traffic device 27*b*, and to traffic device 27*c*. As discussed in other examples, the traffic device 27*b* may decrease delays in order to expedite moving vehicle 50 through the high load cell 32*b*. However, this may disrupt traffic patterns. To promote fairness with respect to vehicle 50, the traffic device may introduce an equal and opposite delay to the path of the vehicle 50. In addition, the cycle of traffic device 27*a* may be adjusted to move more traffic toward traffic device 27*b*, which just experienced a longer than normal green phase of the light cycle.

mobile devices 122 on the bus 61 may be direct cellular users or the bus 61 may provide a wireless access point that connects to the mobile cellular network and provides wireless access to the riders.

The traffic controller 21 may identify that if left unimpeded, the vehicle 60 would enter the same cell 32*a* with the heavy user bus 61. In contrast, vehicles 30 may be light users which are less relevant to the network state. Accordingly, the traffic controller 21 generates a command that causes the traffic device 27*a* to impose a delay on the vehicle 60. The delay may be in the form of a longer than normal red light. The red light may be as long as from a few seconds to a few minutes. The duration of the red light may depend on the upstream vehicles data usage. For example, when cell 32*b* (or a portion of cell 32*b* near cell 32*a*) also includes one or more heavy data users, the duration of the red light may be extended to all the heavy data users to pass.

In one example, the length of the delay depends on the data consumption of the vehicle 60. Light data users may be permitted to enter the highway closer to the bus 61, and heavy data users may be further spaced from the bus 61. In some examples, this control is applied only when the vehicle 60 is a heavy data user.

In one example, all buses or high occupancy vehicles are considered heavy data users. Other examples of heavy data users may include connected cars (e.g., vehicles that provide Internet content through onboard systems). Occasionally there are other users driving on the highway which are particularly heavy Internet users because of streaming video or other high bandwidth applications on smartphones, tablet computers, or laptop computers. By considering the level of internet demand from the users queuing to enter the highway, and the relative location of the heaviest Internet users on the highway, one can smooth and improve the overall demand for Internet connectivity from those traveling on the highway.

In one example, the traffic commands may be generated by the traffic controller 21 to aggregate particular mobile devices 122 such as connected cars. Connected cars may benefit from one another from the sharing of information. For example, if two mobile devices in different or the same vehicles are receiving the same Multimedia Broadcast Multicast Service (MBMS) signal, it would be an advantage for the cellular network to keep these vehicles on the same cell receiving the same shared MBMS signal. MBMS is a point-to-multipoint service where multiple mobiles receive the same broadcast signal simultaneously, thus reducing the network resource utilization. Other shared signals are possible.

In one example, the traffic device is an electronic sign at an intersection or before an intersection that relays data traffic information to the drivers. In many areas, especially urban areas, more than one route exist across a city (e.g., direct route versus bypass). Electronic signs may inform drivers the relative driving time for the two routes (e.g., Expressway A to city center—11 minutes, Expressway B to city center—13 minutes).

The electronic sign may present similar information regarding a general description of data congestion (e.g., Expressway A to city center—Low Cellular Data Rates, Expressway B to city center—High Cellular Data Rates). The general description of data congestion may be an arrow and a message "optimal cellular route" to direct the driver. This information could be provided in combination with the driving time so that the driver can balance driving time and data availability. The electronic sign may display an image such as "NO DATA" or a phone image or cell tower image with an X across it or a red circle with a line drawn across. In another example, the electronic sign may present a specific description of data congestion (e.g., Expressway A to city center—Cellular Data Rates 1-2 megabits per second (MPS), Expressway B to city center—3-5 MPS Cellular Data).

The preceding embodiments describe traffic commands generated based on cellular congestion and/or mobile device data usage. However, other factors may be considered by the traffic controller 21. For example, the traffic controller 21 may issue traffic commands to increase or decrease delay at traffic devices 27 based on a traffic score. The traffic score may include one or more components selected from cellular congestion, mobile device data usage, current traffic levels, historical traffic levels, the time of day, the day of the week, an event schedule, current weather, historical weather, or other factors. The components may be summed, or weighted summed, to calculate the traffic score. Some components may have negative values. The delay introduced by the traffic controller 21 may be proportional to the traffic score.

The traffic controller 21 may be associated with a particular town, city, or jurisdiction. The traffic controller 21 may receive traffic information from other traffic controllers in other towns, cities, or jurisdictions. Likewise, the communication network device 25 may distribute user data usage and cell or geographic data usage to traffic controllers of multiple towns, cities, or jurisdictions.

Figure 7:
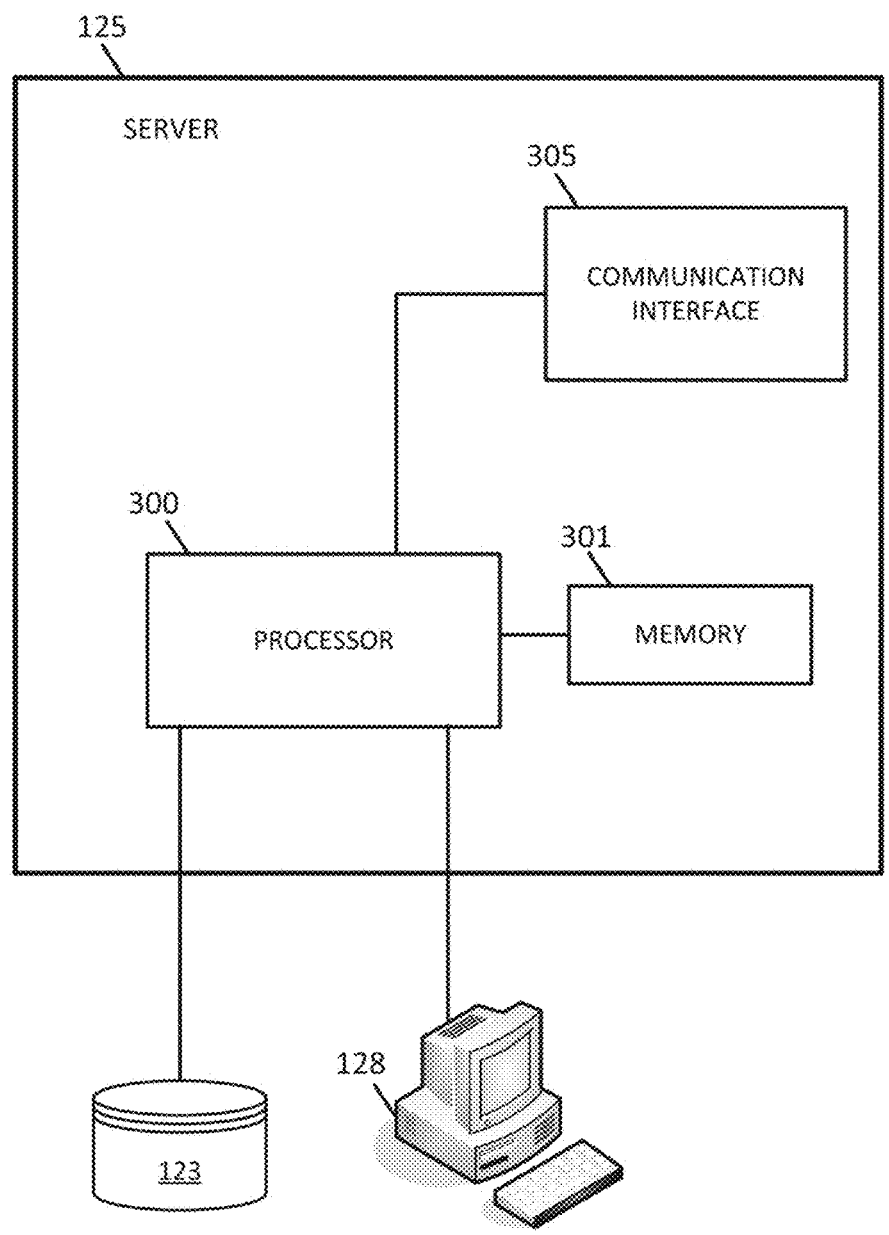
FIG. 7 illustrates an example network device of the system of FIG. 1.
Figure 8:
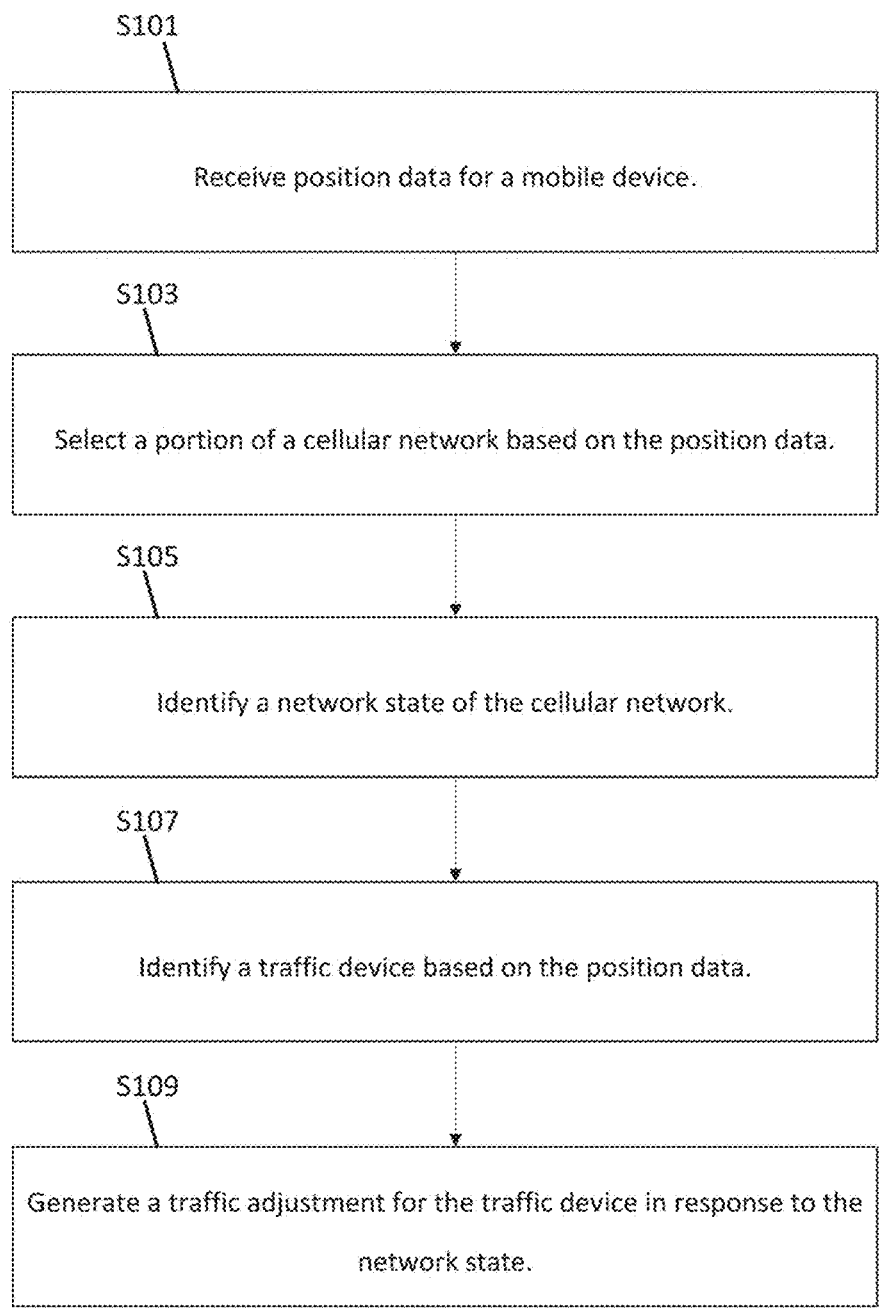
FIG. 8 illustrates an example flowchart for the network device.

FIG. 7 illustrates an exemplary server 125 of the system of FIG. 1. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of user inputs made via the workstation 128 or the mobile device 122. The server 125 may perform the functions described above with respect to any combination of the traffic controller 21, the communication network device 25, and the vehicle monitoring device 23. FIG. 8 illustrates an example flowchart for server 125. Additional or different features may be included in the flowchart.

At act S101, the processor 300 or the communication interface 305 receives position data from the mobile device 122. The position data may be geographic coordinates from GPS onboard the mobile device 122. The position data may be derived from snooping on data packets sent from the mobile device 122. At act S103, the processor 300 selects a portion of a cellular network based on the position data. The portion of the cellular network may be a particular cellular tower or transceiver or cell of the cellular network. The memory 301 may include a lookup table that associates geographical coordinates with particular portions of the cellular network. Alternatively, the communication interface 305 may receive a base station identifier from the mobile device 122. The base station identifier describes the portion of the cellular network.

At act S105, the processor 300 identifies a network state of the portion of the cellular network. The network state may be determined according to the examples above. The network state may be based on the number of users in the geographic area of the portion of the cellular network. The network state may be based on particular data rates reported by mobile devices. The network state may be dependent on the signal strengths reported by mobile devices. The processor 300 may compare the network state to a threshold value. When the network state exceeds the threshold value, the portion of the cellular network is labeled congested. When the network state is less than the threshold value, the portion of the cellular network is labeled uncongested.

At act S107, the processor 300 identifies a traffic device based on the position data. For example, the memory 301 may include a lookup table that associates the locations of traffic devices with geographic coordinates. The selected traffic device may be the nearest traffic device to the mobile device based on the position data or the nearest traffic data downstream of the mobile device along a current road segment or series of road segments that the mobile device is traveling on.

At act S109, the processor 300 generates a traffic adjustment for the traffic device in response to the network state. The traffic device may be a traffic light signal or a variable sign. The variable sign is configured to display a speed limit as a function of the network state for the traffic adjustment. For example, the speed limit may be raised to increase the rate at which mobile devices leave a congested portion of the cellular network, and the speed limit may be lowered to slow the rate at which mobile devices enter a congested portion of the cellular network. The traffic light signal may increase or decrease a wait time as a function of the network state for the traffic adjustment. Traffic light signals through which vehicles move towards a congested cell may be adjusted to increase wait times. Traffic light signals through which vehicles exit a congested may be adjusted to decrease wait times. The traffic light signal may introduce a delay for a highway ramp based on the network state for the traffic adjustment.

Figure 9:
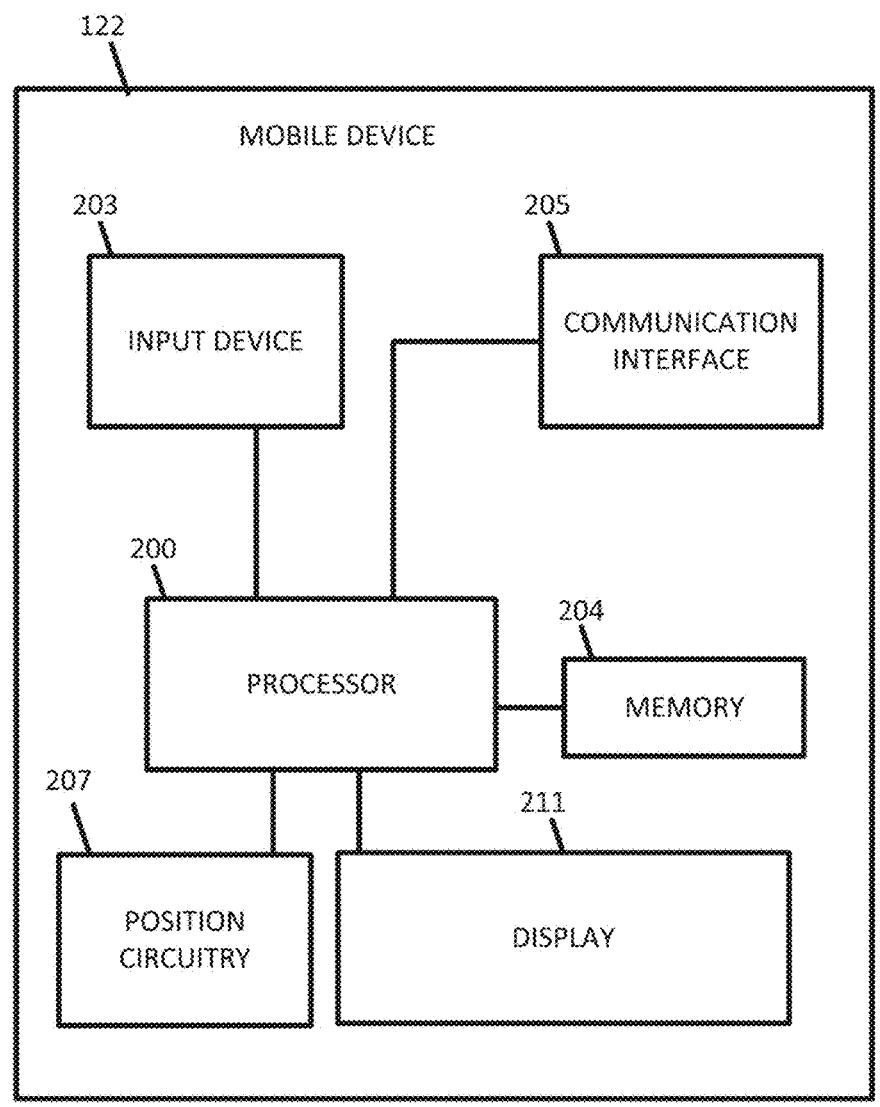
FIG. 9 illustrates an example mobile device of the system of FIG. 1.
Figure 10:
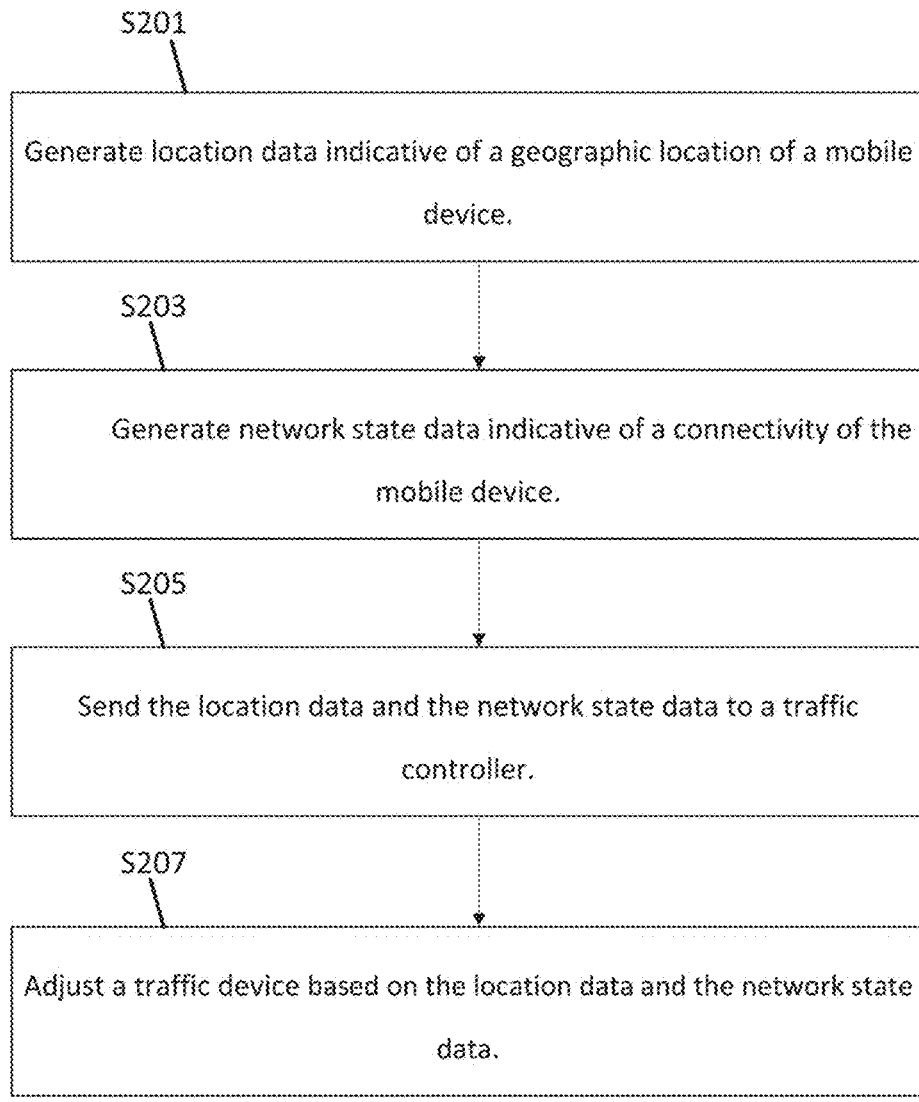
FIG. 10 illustrates an example flowchart for the mobile device.

FIG. 9 illustrates an exemplary mobile device 122 of the system of FIG. 5. The mobile device 122 includes a processor 200, a memory 204, an input device 203, a communication interface 205, position circuitry 207, and a display 211. Additional, different, or fewer components are possible for the mobile device/personal computer 122. FIG. 10 illustrates a flowchart for the mobile device 122. Additional, different, or fewer acts may be included.

At act S201, the position circuitry 207 or the processor 200 generates location data indicative of a geographic location of the mobile device 122. The processor 200 may be configured to receive data indicative of the location of the mobile device 122 from the position circuitry 207. The positioning circuitry 207, which is an example of a positioning system, is configured to determine a geographic position of the mobile device 122.

At act S203, the processor 200 generates network state data indicative of a connectivity of the mobile device 122. The processor 200 may analyze a cellular signal received at the communication interface 205. The processor 200 may determine how many PRBs are allocated to the cellular signal. The processor 200 may calculate a throughput or bandwidth of the cellular signal.

At act S205, the processor 300 sends the location data and the network state data to an external device (e.g., server 125 or traffic controller 21). At act S207, the external device may generate a command to adjust a traffic device in the examples above based on the location data and the network state data. Alternatively, the mobile device 122 acts as a traffic device, and the processor 300 adjusts the traffic device based on the location data and the network state. For example, the mobile device 122 may give the user the option of avoiding an area because of cellular congestion.

In one embodiment, the mobile device 122 communicates with an assisted driving device or acts as the assisted driving device. The assisted driving device may operate an autonomous vehicle, a highly assisted vehicle, or an advanced driving assistance system. The mobile device 122 may generate a driving command message or receive the driving command message from the external device. The driving command may be a microspeed tuning command to incrementally adjust speed up or down based on the network state.

The term autonomous vehicle may refer to a self-driving or driverless mode in which no passengers are required to be on board to operate the vehicle. An autonomous vehicle may also be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The driving command may instruct the autonomous vehicle to increase speed (accelerate), decrease speed (decelerate or brake), or follow a route based on the network state of the cellular network.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The HAD vehicle may be controlled to increase or decrease speeds based on the driving command based on network state.

An Advanced Driver Assisted System (ADAS) vehicle includes one or more partially automated systems in which the vehicle alerts the driver. The driving command may instruct the ADAS vehicle to present a message to the user to suggest acceleration, braking, or making a turn based on the network state of the cellular network. Features may include adaptive cruise control, automate braking, or steering adjustments.

The position circuitry 207 such as a dead reckoning-type system, cellular location, or combinations of these or other systems. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The position circuitry may be included in the mobile device 122 or in another module of the vehicle.

In addition, the autonomous or highly automated driving vehicle may include sensors for identifying the surrounding and location of the car. The sensors may include light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

One additional example, an engine sensor, may include throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor, may include a steering wheel angle sensor, a speedometer sensor, or a tachometer sensor. The vehicle sensor may determine road status such as the shape or turns of the road, the existence of speed bumps, the existence of pot holes, the wetness of the road, or the existence or ice, snow, or slush.

The database 123 may include locations (geographic coordinates) for cellular access points and traffic devices, as described above. In addition, the database 123 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 123 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 123 may include data about the POIs and their respective locations in the POI data records. The database 123 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 123 can include event data (e.g., traffic incidents, constructions, scheduled events, unscheduled events, etc.) associated with the POI data records or other records of the database 123.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 123 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an LTE, 3GPP, 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method of traffic control for at least one road via a traffic device, the method comprising:
    detecting, by a processor of a traffic system, a presence of a mobile device at a location on the at least one road, wherein the mobile device is connected to a mobile network;
    associating, by the processor, the mobile device with a portion of the mobile network corresponding to the location of the mobile device on the at least one road;
    determining, by the processor, a congestion or usage level of the corresponding portion of the mobile network associated with the mobile device; and
    controlling, by the processor, the traffic device at the location on the at least one road based on the determined congestion or usage level, wherein the mobile device is routed through the location on the at least one road via the traffic device.

2. The method of claim 1, wherein the traffic device includes a traffic signal or a sign.

3. The method of claim 2, wherein the traffic signal increases or decreases a wait time as a function of the determined congestion or usage level of the corresponding portion of the mobile network.

4. The method of claim 2, wherein the traffic signal introduces a delay for a highway ramp based on the determined congestion or usage level of the corresponding portion of the mobile network.

5. The method of claim 1, wherein the determined congestion or usage level is determined based on a measurement of transmission resources of the mobile network or utilization of the mobile network.

6. The method of claim 5, wherein the transmission resources include bandwidth, signal strength, speed, or combinations thereof.

7. The method of claim 5, wherein the utilization of the mobile network is based on a number of mobile devices connected to the mobile network or a type of data user of the mobile network, the mobile device being classified as a heavy data user or a light data user according to data usage of the mobile device.

8. An apparatus for traffic control for at least one road via a traffic device, the apparatus comprising:
    a communication interface configured to detect a presence of a mobile device at a location on at least one road, wherein the mobile device is connected to a mobile network; and
    a controller configured to:
        associate the mobile device with a portion of a mobile network corresponding to the location of the mobile device on the at least one road;
        determine a congestion or usage level of the corresponding portion of the mobile network associated with the mobile device, and
        control the traffic device at the location on the at least one road based on the determined congestion or usage level, wherein the mobile device is routed through the location on the at least one road via the traffic device.

9. The apparatus of claim 8, wherein the traffic device displays a speed limit as a function of the determined congestion or usage level of the corresponding portion of the mobile network.

10. The apparatus of claim 8, wherein the traffic device displays a message based on the determined congestion or usage level of the corresponding portion of the mobile network.

11. The apparatus of claim 8, wherein the determined congestion or usage level is based on a number of mobile devices connected to the mobile network, historic usage patterns of mobile devices, or combinations thereof.

12. The apparatus of claim 11, wherein the historic usage patterns are based on time of day, day of week, or an event.

13. A method of controlling flow of road traffic in and out of one or more cells within a mobile network connected to a mobile device, the method comprising:
- detecting, by a processor of a traffic system, a presence of the mobile device associated with a vehicle at a location on a road;
- identifying, by the processor, the one or more cells of the mobile network corresponding to the location of the mobile device;
- determining, by the processor, a congestion or usage level for the one or more cells of the mobile network; and
- routing, by the processor, the vehicle through the one or more cells of the mobile network based on the determined congestion or usage level, wherein routing the vehicle comprises providing, by the processor, a traffic command to the mobile device associated with the vehicle, wherein the mobile device generates a driving command in response to receiving the traffic command to control an operation of the vehicle.

14. The method of claim 13, wherein said routing the vehicle includes increasing a rate of movement of the vehicle from a cell having a high congestion or usage level to a cell having a low congestion or usage level, decreasing a rate of movement of the vehicle from a cell having a low congestion or usage level to a cell having a high congestion or usage level, or combinations thereof.

15. The method of claim 13, wherein the driving command engages a mechanical system of the vehicle.

16. A non-transitory computer readable medium including instructions that when executed by a processor are operable to:
- detect a presence of a mobile device associated with a vehicle at a location on at least one road, wherein the mobile device is connected to a mobile network;
- associate the mobile device with a portion of the mobile network corresponding to the location of the mobile device on the at least one road;
- determine a congestion or usage level of the corresponding portion of the mobile network associated with the mobile device; and
- route the vehicle through the location on the at least one road based on the determined congestion or usage level, wherein routing the mobile device comprises:
- controlling, by the processor, a traffic device at the location on the at least one road based on the determined congestion or usage level and routing the vehicle through the location on the at least one road via the traffic device; or
- providing, by the processor, a traffic command to the mobile device associated with the vehicle, wherein the mobile device generates a driving command in response to receiving the traffic command to control an operation of the vehicle.

17. The non-transitory computer readable medium of claim 16, wherein the driving command engages a mechanical system of the vehicle.

* * * * *